United States Patent
Lentz et al.

(10) Patent No.: US 12,452,357 B2
(45) Date of Patent: Oct. 21, 2025

(54) PHONE DETECTION AND REMINDER SYSTEM FOR A VEHICLE

(71) Applicant: FCA US LLC, Auburn Hills, MI (US)

(72) Inventors: Michael F Lentz, Macomb, MI (US); Mark A Wilson, Oxford, MI (US)

(73) Assignee: FCA US LLC, Auburn Hills, MI (US)

( * ) Notice: Subject to any disclaimer, the term of this patent is extended or adjusted under 35 U.S.C. 154(b) by 237 days.

(21) Appl. No.: 18/188,713

(22) Filed: Mar. 23, 2023

(65) Prior Publication Data

US 2024/0323271 A1 Sep. 26, 2024

(51) Int. Cl.
H04M 1/72409 (2021.01)
H04M 1/72412 (2021.01)
H04M 1/72454 (2021.01)

(52) U.S. Cl.
CPC . *H04M 1/724098* (2022.02); *H04M 1/72412* (2021.01); *H04M 1/72454* (2021.01)

(58) Field of Classification Search
CPC ....... H04M 1/724098; H04M 1/72412; H04M 1/72454
See application file for complete search history.

(56) References Cited

U.S. PATENT DOCUMENTS

| | | | |
|---|---|---|---|
| 2009/0189570 A1* | 7/2009 | Abe | B60R 16/0232 320/162 |
| 2011/0092159 A1* | 4/2011 | Park | H04L 63/102 455/41.2 |
| 2015/0116121 A1* | 4/2015 | Hur | G08B 21/24 340/686.6 |
| 2016/0176381 A1* | 6/2016 | Krawciw | B60R 25/04 340/5.72 |

OTHER PUBLICATIONS

Klein, Matt; How to Create iPhone Reminders for When you Get In and Out of Your Car; May 10, 2016. https://www.howtogeek.com/253855/how-to-create-iphone-reminders-for-when-you-get-in-and-out-of-your-car/.

* cited by examiner

Primary Examiner — Farid Seyedvosoghi
(74) Attorney, Agent, or Firm — Jeremy J. Klobucar

(57) ABSTRACT

A method of providing an alert to a user of a vehicle includes determining a change in a vehicle operating state, determining if a remote electronic device is detected within the vehicle, and providing an alert to a user if certain conditions are met. An alert is provided if: a) the change in vehicle operating state was from on to off and a phone was detected within the vehicle; or b) the change in vehicle operating state was from off to on and phone was not detected within the vehicle.

12 Claims, 3 Drawing Sheets

PHONE DETECTION AND REMINDER SYSTEM FOR A VEHICLE

FIELD

The present disclosure relates to a vehicle having a phone detection and reminder system.

BACKGROUND

Mobile phones have become ubiquitous, are used for many tasks and are usually in the presence of a user. Many vehicles permit connection of a phone to the vehicle for use of features of the phone while in the vehicle and to charge the battery of the phone. When connected to a vehicle, a phone is often placed on or in a console of the vehicle and is not held by a user. Thus, phones can be left in a vehicle after use of the vehicle. Likewise, a phone may be left by a user at an establishment before use of a vehicle, such that the phone is not brought by the user into the vehicle, and will be left behind if the vehicle departs without the phone therein.

SUMMARY

In at least some implementations, a method of providing an alert to a user of a vehicle includes determining a change in a vehicle operating state, determining if a remote electronic device is detected within the vehicle, and providing an alert to a user if certain conditions are met. An alert is provided if: a) the change in vehicle operating state was from on to off and a phone was detected within the vehicle; or b) the change in vehicle operating state was from off to on and phone was not detected within the vehicle.

In at least some implementations, the step of determining if a remote electronic device is detected within the vehicle includes determining if a phone is connected to the vehicle wirelessly or via a wired connection. In at least some implementations, the wireless connection is via a Bluetooth interface. In at least some implementations, the wired connection is between the phone and a port of the vehicle.

In at least some implementations, the wireless connection is via a wireless charging interface, and the step is accomplished by determining if power is being provided via the wireless charging interface. In at least some implementations, the wired connection is via a wired charging interface and the step is accomplished by determining if power is being provided via the wired charging interface.

In at least some implementations, the alert includes a visual display, an audible signal, a tactile output or any combination thereof. In at least some implementations, the visual display is provided on a display screen in the vehicle. In at least some implementations, the display screen is part of a human-machine interface of the vehicle or an instrument panel.

In at least some implementations, the method also includes, before the step of providing the alert, determining if a door of the vehicle has moved to an open position.

In at least some implementations, the method also includes, before the step of providing the alert, allowing a predetermined time delay to occur.

In at least some implementations, a method of providing an alert to a user of a vehicle includes determining a change in a vehicle operating state from on to off, or from off to on, determining if a phone is coupled with the vehicle by wireless or wired connection, and providing an alert if: a) the change in vehicle operating state was from on to off and a phone was detected within the vehicle; or b) the change in vehicle operating state was from off to on and a phone was not detected within the vehicle, and if neither (a) nor (b) is determined then an alert is not provided.

The system and method set forth herein may use devices and control system features that already exist in some vehicles, and may implement the methods by simple instructions or application implemented by the vehicle control system. The system can be set up so that a user can opt-in or opt-out of receiving the alerts, such as by choosing options within the HMI of the vehicle. The system can be set up so that the alerts can be customized by a user, including the manner in which alerts are provided, the duration, and the like.

By the systems and methods set forth herein, alerts may be provided with the intent of reminding a user that a phone is detected in the vehicle yet conditions indicate that the vehicle is no longer being used. And by the systems and methods set forth herein, alerts may be provided with the intent of informing a user that phone is not detected in the vehicle yet conditions indicate that the vehicle is intended to be used, which may mean that a user would drive away from a location at which their phone exists.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 4 is a flowchart of a method for providing an alert if a phone is not detected upon turning a vehicle on.

DETAILED DESCRIPTION

Figure 1:
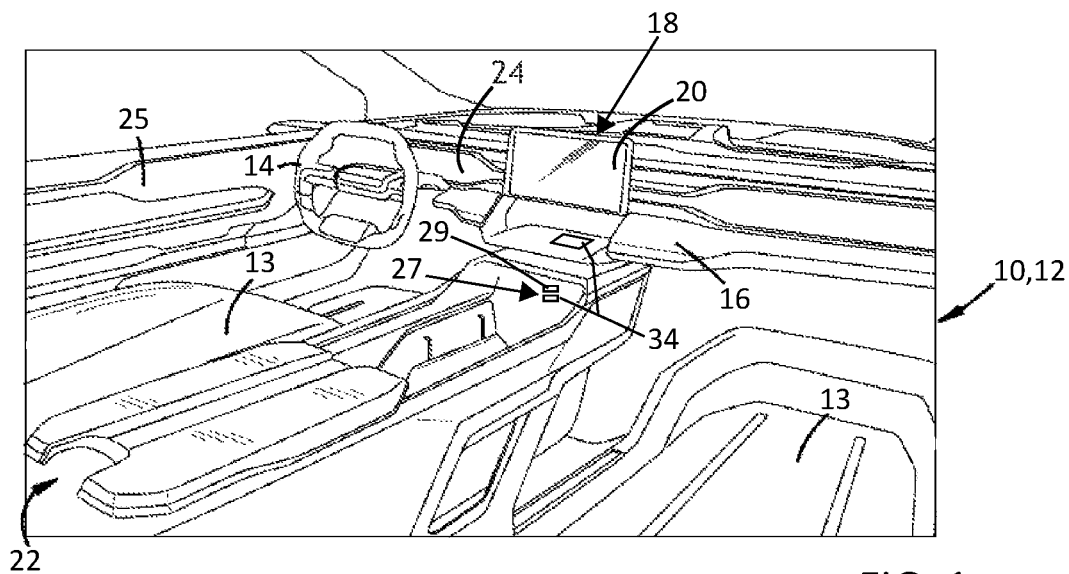
FIG. 1 a perspective view of part of a passenger compartment of a vehicle.

Referring in more detail to the drawings, FIG. 1 illustrates part of a passenger compartment 10 of a vehicle 12. The vehicle 12 may be any desired type of vehicle 12 such as a car or truck of any type, and may include any desired powertrain like an internal combustion engine, one or more electric motors or a hybrid/combination of different powertrains. The passenger compartment 10 may include one or more seats 13, a steering input 14 (e.g. steering wheel), a dashboard 16, infotainment system 18 including a visual display screen 20, a center console 22, an instrument panel 24 and doors 25. The instrument panel 24 may provide one or more displays for information such as for gauges like a fuel gauge, speedometer, tachometer, and warning lights, an interface for vehicle settings information or changes, and the like.

Within the passenger compartment 10, one or more connection interfaces 27 may be provided for coupling a remote electronic device 26 (FIG. 2) to the vehicle 12. The term "remote" is intended to mean that the device is not part of the vehicle 12, and commonly is moved into and out of the vehicle 12. The device 26 may be a mobile phone 26, tablet or personal computer (e.g. a laptop computer), for example, and this description will refer to the device as a phone 26 for simplicity. The phone 26 may be coupled to the vehicle 12 to charge the phone 26, to permit use of the phone 26 through a vehicle interface, or both. Using the phone 26 can include making phone calls, accessing or playing, on a vehicle audio/visual system, media files (images, video or audio) stored on the phone 26 or streamed to/by the phone 26, or using applications stored on the phone 26, like navigation applications. The connection interface 27 for connecting the phone 26 to the vehicle 12 may include a wired connection, such as by connecting a cord to both the phone 26 and a port of the vehicle 12, such as a USB port 29, or wirelessly such as via a wifi or Bluetooth interface with a controller or control system 28 (FIG. 2) in the vehicle 12, in known manner.

Figure 2:
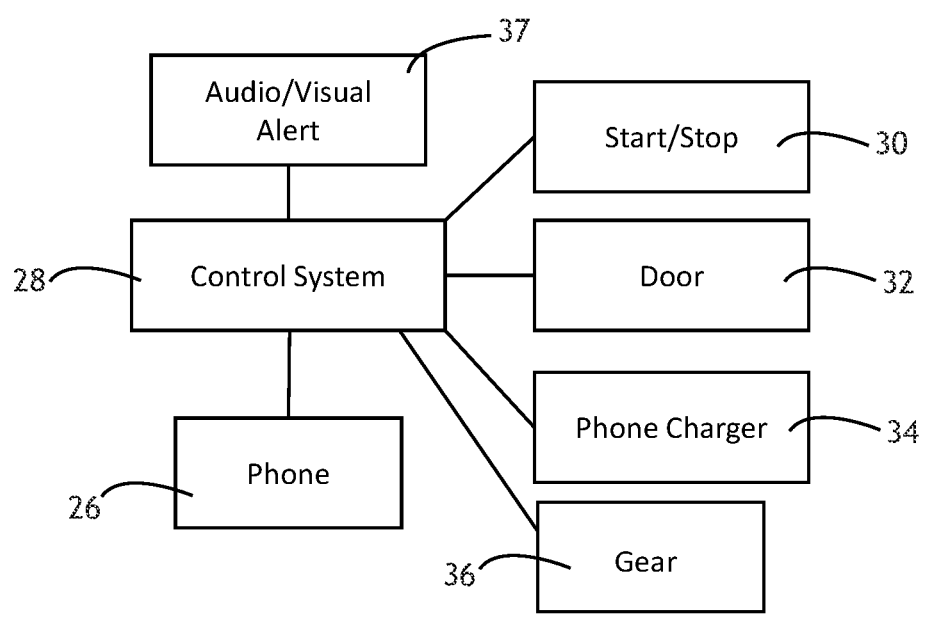
FIG. 2 is a diagrammatic view of part of a vehicle control system.

As shown in FIG. 2, the vehicle 12 may include a control system 28 that may comprise one or more microcontrollers and memory including programs or instructions for control of various aspects of vehicle operation. The control system 28 is communicated with various systems, devices and sensors of the vehicle 12, such as a vehicle start/stop button 30, door switches 32, a phone charger 34, transmission gear selector 36, and others, as desired. The vehicle start/stop button 30 may be used to start a combustion engine, or to put an electric vehicle 12 into an operational mode wherein a gear selector 36 may be operated to choose a drive gear (forward or reverse) for use of the vehicle 12. The door switches 32 are used to detect whether a door is opened or closed. The phone charger 34 provides electrical power to the phone 26 to charge a battery of the phone 26, and in at least some implementations, the vehicle control system 28 can determine if a phone 26 is being provided power via the phone charger 34, or if a phone 26 is otherwise connected to the vehicle power system. The transmission gear selector 36 permits selection of a drive gear for use of the vehicle 12, and the control system 28 can determine a currently selected gear. Further, the vehicle 12 includes one or more devices 37 by which an alert is provided within the vehicle. When a phone is connected to the vehicle, the alert device may include the phone, if the vehicle can provide an output via the phone (e.g. the control system 28 can cause the phone to play an audible sound or signal, or vibrate, or light up a display screen of the phone).

The control system 28 also is connected to the instrument panel 24 other display screens 20 and devices to provide information to a vehicle driver or passenger. The information includes, by way of non-limiting examples, alerts or warnings that may be provided visually, audibly, tactilely or any combination of these. Visual alerts may come in the form of illuminated icons, blinking light(s) or words or the like provided on a visual display like the instrument panel 24 and/or a display screen 20 which may be separate from the instrument panel and used to facilitate a human-machine interface (HMI) of the vehicle 12. Audible feedback can be provided through one or more speakers which may be part of or separate from a vehicle 12 sound system used for entertainment. Tactile feedback or alerts can be provided, for example, by vibrations from a small motor provided in a desired location and operated to gain the attention of one or more vehicle 12 passengers. The vibrations may be felt and may be provided to direct attention in a direction or toward an area. Vibrations may also be audible, to similarly draw attention in a direction or toward an area.

Figure 3:
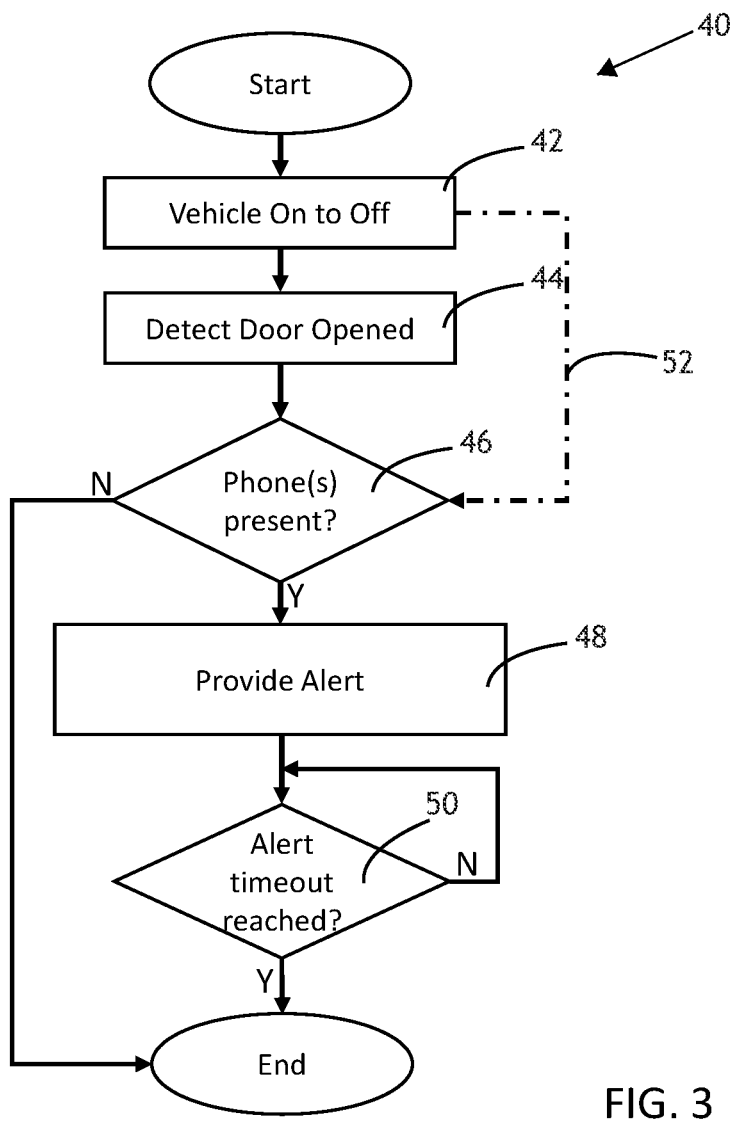
FIG. 3 is a flowchart of a method for providing an alert regarding presence of a phone after a vehicle is turned off.

A method 40 of providing an alert regarding presence of a phone 26 after a vehicle 12 is turned off, to try and prevent a phone 26 being left in the vehicle 12 after passengers have departed from the vehicle 12, is shown in FIG. 3. The method 40 may begin at 42 upon detection of a change of state of the vehicle 12 from an on state to an off state. In a vehicle 12 with a combustion engine, this would occur when an operating engine is shut off, such as may occur by pressing a start/stop button 30 or turning a key in an ignition switch. In an electric vehicle 12 this may occur in any desired way, such as by pressing a start/stop button 30, turning a key of a key switch, placing a transmission gear selector 36 in a park or off position, or the like.

Upon detection that the vehicle 12 has been changed to the off state, the method continues to step 44. In this step 44, the vehicle 12 detects when a door has been moved from a closed position to an open position, such as may be done by detection of a change of state of a door switch 32. In this way, the method seeks to determine that the vehicle 12 is both off and one or more passengers intend to depart from the vehicle 12, indicating that further use of the vehicle 12 might not occur for some time.

After a door is detected as being opened, the method continues to step 46. In step 46, it is determined whether a phone 26 is present in the vehicle 12. This may be done in any desired manner. Where a phone 26 is coupled to the vehicle 12 by a wired or wireless connection, whether the phone 26 is coupled to the vehicle 12 control system or simply connected to a charger 34, this connection can be checked to determine if the phone 26 still is coupled to the vehicle 12. If that determination is affirmative, then the method proceeds to step 48 and an alert is provided. If the determination is negative, that a phone 26 is not detected within the vehicle 12, then the method may end as no alert is determined to be needed.

An alert may be provided in any desired manner, including by visual display on the instrument panel 24 or other display screen 20 (including a screen of the phone 26) or area in the vehicle 12, by illuminating a light, by flashing of blinking on and off a light or portion of the instrument panel or display screen, or the like. An audible alert may be provided, such as a chime, buzz, tone, or a recorded message describing the presence of a phone 26 may be provided via a speaker or the phone 26. A tactile alert could also be provided, such as to direct a passenger's attention in the direction of the phone 26, or in the direction of a visual alert/display.

To avoid undue drain on the vehicle 12 electrical supply, or for other reasons, the alert may be provided only for a limited duration. The duration may be a set time from initially providing the alert, or a time after all doors that were detected as being opened have been closed, or a user may terminate the alert by taking some action (e.g. pressing a button or selecting an option via the HMI to cancel the alert). The method may thus, in step 50, determine if the alert duration has ended or if the alert was terminated by a user, and if so, the method may end. If not, the alert may be provided again or still provided, until the duration has ended.

An alternate method does not require a door to be opened and so does not require step 44. Instead, as indicated by the dashed line 52, after the vehicle 12 has been turned off, the method may proceed to step 46 and check to see if a phone 26 is present. In this way, an alert may be provided sooner, if desired. Of course, the method may include additional steps, as desired. For example, the method may include a time delay after detection of the change of state of vehicle operation from on to off, to permit a user time to disconnect their phone 26, gather belongings and otherwise prepare to depart the vehicle 12. In at least some implementations, the time delay is thirty seconds or less, with fifteen seconds or less, or five seconds or less or 3 seconds or less being representative options. In addition to or instead of a method that uses a door switch or other detection of a door opening, the method may use a seat occupancy switch or sensor that is responsive to presence of a person on the seat (such as may be used by seat belt indicator warning systems). That is, upon detection of the change of state of vehicle 12 operation from on to off, the system may next determine that a driver or other passenger has left their seat (e.g. by detecting a change in state of the seat occupancy switch/sensor) and may immediately provide an alert if a phone 26 still is detected within the vehicle 12.

Figure 4:
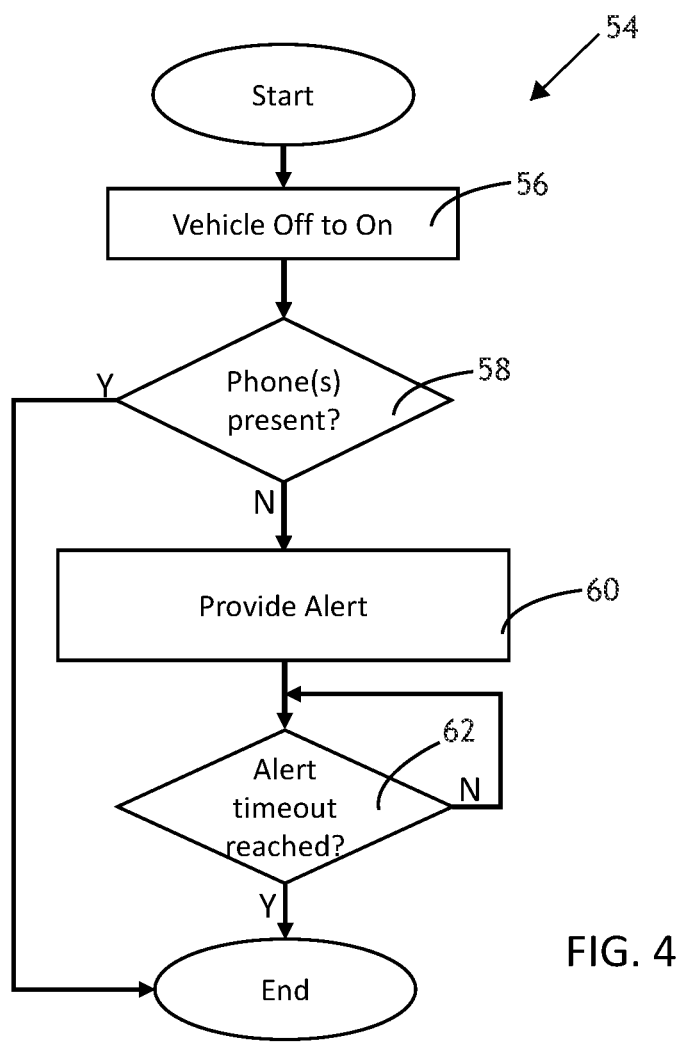

While the method 40 of FIG. 3 is directed toward preventing a phone 26 from being left in the vehicle 12 after use of the vehicle has terminated, a method 54 as shown in FIG. 4 is directed toward preventing a vehicle 12 from being operated (e.g. departing) without a phone 26 being detected. This method can help prevent someone from driving off and leaving their phone 26 behind.

Some vehicles 12 have settings that may be selected to enable a Bluetooth or other wireless connection of a phone 26 to the vehicle 12 whenever a selected phone 26 is detected within the wireless connection range. In this way, upon entering a vehicle and turning on an electrical system of the vehicle, the phone 26 may be wirelessly connected or paired with the vehicle. Other settings may be provided to enable an alert to be given if the vehicle 12 is operated without a phone 26 being connected to the vehicle 12 by a wired connection, if desired.

This method may begin or continue at step 56 when the state of the vehicle 12 or vehicle operation has been determined to have changed from off to on. This may be done by turning a key or pushing a button or moving a transmission gear selector (which may require pressing a brake, where activation of the brake may also be detected), by way of some non-limiting examples. Upon detection of the change of state of the vehicle 12, the method continues to step 58 and the system determines if a phone 26 is connected to the vehicle 12 or not.

If a phone 26 is connected the method 54 may end without an alert being given. If a phone 26 is not detected as being connected to the vehicle, then an alert may be provided at step 60 to let the driver or other passengers know that no phone 26 has been detected. The alert may be provided in any desired manner or combination of manners and for any desired duration. After the alert is provided, the method may continue to step 62 to determine, for example, if the full alert duration has transpired, or if a user has canceled the alert, upon which occurrence the method may end.

The system may use devices and control system features that already exist in some vehicles, and may implement the methods by simple instructions or application implemented by the vehicle control system. The system can be set up so that a user can opt-in or opt-out of receiving the alerts, such as by choosing options within the HMI of the vehicle. The system can be set up so that the alerts can be customized by a user, including the manner in which alerts are provided, the duration, and the like.

By the systems and methods set forth herein, alerts may be provided with the intent of reminding a user that a phone 26 is detected in the vehicle 12 yet conditions indicate that the vehicle 12 is no longer being used. And by the systems and methods set forth herein, alerts may be provided with the intent of informing a user that phone 26 is not detected in the vehicle 12 yet conditions indicate that the vehicle 12 is intended to be used, which may mean that a user would drive away from a location at which their phone 26 exists.

What is claimed is:

1. A method of providing an alert to a user of a vehicle, comprising the steps of:
   determining a change in a vehicle operating state from off to on;
   determining that a remote electronic device is not connected to the vehicle by a wired connection between the phone and a port of the vehicle; and
   providing an alert in the vehicle.

2. The method of claim 1 wherein the wired connection is via a wired charging interface and the step is accomplished by determining whether power is being provided via the wired charging interface.

3. The method of claim 1 wherein the alert includes a visual display, an audible signal, a tactile output or any combination thereof.

4. The method of claim 3 wherein the visual display is provided on a display screen in the vehicle.

5. The method of claim 4 wherein the display screen is part of a human-machine interface of the vehicle or an instrument panel.

6. The method of claim 1 which also includes, before the step of providing the alert, allowing a predetermined time delay to occur.

7. A method of providing an alert to a user of a vehicle, comprising the steps of:
   determining a change in a vehicle operating state from on to off, or from off to on;
   determining when a phone is coupled with the vehicle by a wired connection; and providing an alert when: a) the change in vehicle operating state was from on to off and a phone was detected within the vehicle; or b) the change in vehicle operating state was from off to on and a phone was not detected within the vehicle, and when neither (a) nor (b) is determined then an alert is not provided, and wherein the wired connection is between the phone and a port of the vehicle.

8. The method of claim 7 wherein the wired connection is via a wired charging interface and the step is accomplished by determining whether power is being provided via the wired charging interface.

9. The method of claim 7 wherein the alert includes a visual display, an audible signal, a tactile output or any combination thereof.

10. The method of claim 9 wherein the visual display is provided on a display screen in the vehicle.

11. The method of claim 7 wherein part (a) of the step of providing an alert also includes determining a change in a state of a seat occupancy switch that indicates that a seat of the vehicle that was previously occupied is no longer occupied.

12. The method of claim 7 wherein part (b) of the step of providing an alert also includes determining a change in a state of a seat occupancy switch that indicates that a seat of the vehicle that previously was not occupied is occupied.

* * * * *